(12) United States Patent
Chi et al.

(10) Patent No.: US 11,460,121 B1
(45) Date of Patent: Oct. 4, 2022

(54) SAFETY RELIEF VALVE FOR HIGH-PRESSURE HYDROGEN CYLINDER

(71) Applicant: Guangdong OPR Hydrogen Energy Technology Co., Ltd., Foshan (CN)

(72) Inventors: Ming Chi, Foshan (CN); Yong Bai, Foshan (CN); Jun Li, Foshan (CN); Zhiyong Fu, Foshan (CN); Qiaoying Shi, Foshan (CN); Donghui Chen, Foshan (CN)

(73) Assignee: Guangdong OPR Hydrogen Energy Technology Co., Ltd., Foshan (CN)

( * ) Notice: Subject to any disclaimer, the term of this patent is extended or adjusted under 35 U.S.C. 154(b) by 0 days.

(21) Appl. No.: 17/376,113

(22) Filed: Jul. 14, 2021

(30) Foreign Application Priority Data

Mar. 9, 2021 (CN) .......................... 202110252718.X

(51) Int. Cl.
| | |
|---|---|
| *F16K 17/40* | (2006.01) |
| *F16K 17/00* | (2006.01) |
| *F16K 17/38* | (2006.01) |
| *F16K 31/00* | (2006.01) |

(52) U.S. Cl.
CPC .......... *F16K 17/003* (2013.01); *F16K 17/383* (2013.01); *F16K 17/403* (2013.01); *F16K 31/002* (2013.01)

(58) Field of Classification Search
CPC .... F16K 17/003; F16K 17/383; F16K 17/403; F16K 31/002
USPC .................................. 137/68.12, 72, 74, 468
See application file for complete search history.

(56) References Cited

U.S. PATENT DOCUMENTS

| | | | | | |
|---|---|---|---|---|---|
| 2,271,786 | A | * | 2/1942 | Watkins | ................... F16K 17/06 |
| | | | | | 220/89.4 |
| 4,727,903 | A | * | 3/1988 | Sturgis | ..................... F16K 17/30 |
| | | | | | 137/75 |
| 5,511,576 | A | * | 4/1996 | Borland | ................ F16K 17/383 |
| | | | | | 137/72 |
| 5,762,091 | A | * | 6/1998 | Sarne | .................... F16K 17/383 |
| | | | | | 137/79 |
| 5,848,604 | A | * | 12/1998 | Eihusen | ................ F16K 17/383 |
| | | | | | 137/72 |

(Continued)

FOREIGN PATENT DOCUMENTS

CN 109099311 A 12/2018

*Primary Examiner* — Minh Q Le
(74) *Attorney, Agent, or Firm* — Bayramoglu Law Offices LLC

(57) ABSTRACT

A safety relief valve for a high-pressure hydrogen cylinder is provided therein with a compression spring and an adjusting nut. The adjusting nut can move up and down to adjust the pressure of the compression spring to compress a sealing plug, so as to adjust the pressure in the hydrogen cylinder to reach an upper limit of pressure relief, which is convenient. Meanwhile, the safety relief valve is provided therein with a fusible seal. When the temperature is lower than a melting point, the fusible seal solidifies, and the sealing plug keeps a gas outlet sealed to prevent hydrogen leakage. When the temperature is higher than the melting point, the fusible seal melts. When the pressure in the hydrogen cylinder is higher than the set upper limit, the sealing plug is forced to open, and the hydrogen flows from an exhaust hole to a hydrogen collection tube.

10 Claims, 1 Drawing Sheet

(56) References Cited

U.S. PATENT DOCUMENTS

| | | | | |
|---|---|---|---|---|
| 6,367,499 B1 * | 4/2002 | Taku | ............ | F17C 13/04 |
| | | | | 251/282 |
| 6,814,097 B2 * | 11/2004 | Girouard | ............ | F16K 17/383 |
| | | | | 137/72 |
| 6,866,057 B1 * | 3/2005 | Buehrle, II | ............ | F16K 17/383 |
| | | | | 137/79 |
| 7,150,287 B2 * | 12/2006 | Kita | ............ | F16K 17/383 |
| | | | | 137/72 |
| 9,945,489 B2 * | 4/2018 | Daido | ............ | F16K 17/383 |
| 2003/0217770 A1 * | 11/2003 | Schultz | ............ | F16K 17/383 |
| | | | | 137/73 |
| 2008/0289695 A1 * | 11/2008 | Holzer | ............ | F16K 17/383 |
| | | | | 137/75 |
| 2009/0092519 A1 * | 4/2009 | Stewart | ............ | F03G 7/06 |
| | | | | 524/556 |
| 2009/0293958 A1 * | 12/2009 | Weatherly | ............ | F16K 17/383 |
| | | | | 137/79 |
| 2015/0260347 A1 * | 9/2015 | Noguchi | ............ | F17C 13/123 |
| | | | | 137/468 |
| 2021/0180708 A1 * | 6/2021 | Ham | ............ | F16K 17/003 |

* cited by examiner

SAFETY RELIEF VALVE FOR HIGH-PRESSURE HYDROGEN CYLINDER

CROSS REFERENCE TO THE RELATED APPLICATIONS

This application is based upon and claims priority to Chinese Patent Application No. 202110252718.X, filed on Mar. 9, 2021, the entire contents of which are incorporated herein by reference.

TECHNICAL FIELD

The present disclosure relates to the technical field of safety valves, in particular to a safety relief valve for a high-pressure hydrogen cylinder.

BACKGROUND

With the increasing demand for energy, fossil fuels and other non-renewable energy sources are on the verge of depletion, and it is known to all that fossil fuels are harmful to the environment. Therefore, the development and utilization of new energy have become an increasingly urgent need. Hydrogen, a new energy source, is acknowledged as a clean energy source in the world and attracts increasing attention and interest.

Hydrogen is also a flammable and explosive gas, and it may explode when mixed with fluorine, oxygen, carbon monoxide and air. Hydrogen needs to be compressed and then stored in a special hydrogen cylinder, and the pressure inside the hydrogen cylinder is relatively high. During the storage and use of the hydrogen cylinder, since the temperature and pressure in the hydrogen cylinder are susceptible to the surrounding influence, an explosion may occur to cause a safety accident once the temperature and pressure are excessively high.

To this end, some safety valves are designed for hydrogen cylinders. The Chinese patent CN109099311A published on Dec. 28, 2018 discloses a safety valve for a hydrogen cylinder. The safety valve includes a joint, a safety bolt, a flow guide sleeve and a rupture disc. The joint is provided with a through hole penetrating upper and lower ends of the joint. The safety bolt and the flow guide sleeve are respectively connected to the upper end of the joint, and a head of the safety bolt is located inside the flow guide sleeve. An accommodating chamber is defined between an upper surface of the joint, the head of the safety bolt and an inner wall of the flow guide sleeve. The flow guide sleeve is provided with a connection port communicating with the accommodating chamber. The safety bolt is provided with a channel for connecting the through hole and the accommodating chamber. The rupture disc is located between the safety bolt and the joint to separate the through hole and the channel. The channel is filled with a fusible alloy. When the pressure and temperature in the hydrogen cylinder respectively reach the burst pressure of the rupture disc and the melting point of the fusible alloy, the safety valve automatically relieves the pressure of the hydrogen in the hydrogen cylinder. In this way, the safety valve can improve the use safety of the hydrogen cylinder and avoid safety accidents.

However, the burst pressure of such a safety valve is restricted and cannot be adjusted, resulting in a small application range.

SUMMARY

In order to solve the above technical problem, the present disclosure designs a safety relief valve for a high-pressure hydrogen cylinder.

The present disclosure adopts the following technical solution.

A safety relief valve for a high-pressure hydrogen cylinder includes a valve block and a pressure relief valve fixedly provided on the valve block. The pressure relief valve includes an external flow guide sleeve and an internal valve core structure. A lower end of the flow guide sleeve is fixedly connected to the valve block, and an upper end of the flow guide sleeve is provided with a pressure relief outlet communicating with the inside. The pressure relief outlet is provided with a connection port connected to a hydrogen collection tube. The valve core structure includes a mounting seat, a sealing plug, a fusible seal, a compression spring and an adjusting nut. The sealing plug tightly seals a gas outlet of the valve block. The mounting seat is provided outside the sealing plug and fixedly connected to the valve block. The mounting seat is threadedly connected to the adjusting nut that is able to be adjusted up and down through a thread. The mounting seat and the adjusting nut are provided therein with a vent channel communicating with the sealing plug. Exhaust holes communicating with the outside are provided at an inner top of the adjusting nut. The compression spring is fixedly connected between the inner top of the adjusting nut and the sealing plug. The outside of the sealing plug is filled with the fusible seal.

Preferably, the fusible seal is made of a fusible alloy.

Preferably, the mounting seat is fixedly screwed to the valve block.

Preferably, the lower end of the flow guide sleeve is threadedly connected to the valve block.

Preferably, three exhaust holes are evenly distributed laterally along a circumference.

Preferably, an internal thread is provided at the connection port.

Preferably, a fastening bayonet is provided at a threaded connection between an outer side of the lower end of the flow guide sleeve and the valve block, and a sealing ring is sleeved on the fastening bayonet.

Preferably, a temperature sensor and a pressure sensor are connected to the valve block.

Preferably, a combined valve seat is connected to the valve block.

Preferably, an isolating ring is fixedly connected to the sealing plug, and an outer side of the isolating ring is evenly provided with vent holes along a circumference to communicate with an inner side of the isolating ring.

The present disclosure has the following advantages. (1) In the present disclosure, a compression spring and an adjusting nut are configured to achieve convenient adjustment by moving the adjusting nut up and down so as to adjust the pressure of the compression spring onto the sealing plug, and adjust the pressure in the hydrogen cylinder to reach an upper limit of pressure relief. (2) A fusible seal is provided in the present disclosure. When the temperature is lower than a melting point, the fusible seal solidifies, and the sealing plug keeps the gas outlet sealed to prevent hydrogen leakage. When the temperature is higher than the melting point, the fusible seal melts. When the pressure in the hydrogen cylinder is higher than the set upper limit, the sealing plug is forced to open, and the hydrogen flows from the exhaust hole to the hydrogen collection tube. In this way, the pressure is relieved to prevent an explosion.

Figure 1:
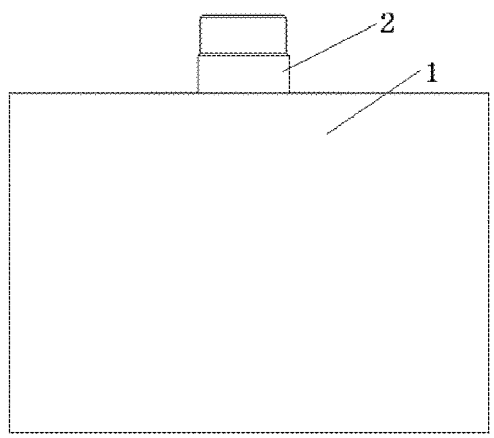
FIG. 1 is a structural schematic diagram according to the present disclosure.

Reference Numerals; 1. valve block; 2. pressure relief valve; 3. flow guide sleeve; 4. mounting seat; 5. sealing plug; 6. fusible seal; 7. vent hole; 8. compression spring; 9. adjusting nut; 10. sealing ring; 11. pressure relief outlet; and 12. exhaust hole.

DETAILED DESCRIPTION OF THE EMBODIMENTS

The technical solutions of the present disclosure are described in further detail below with reference to the specific embodiments and accompanying drawings.

Figure 2:
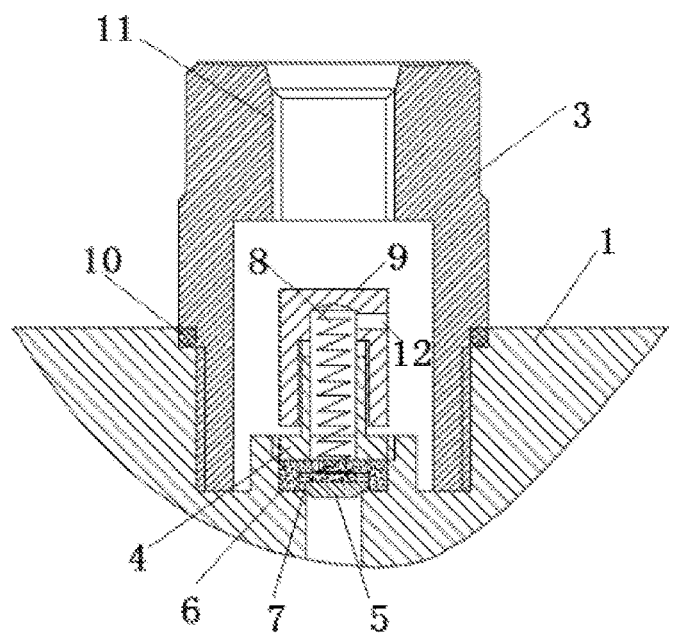
FIG. 2 is a schematic diagram showing a mounting structure of a pressure relief valve according to the present disclosure.
Figure 3:
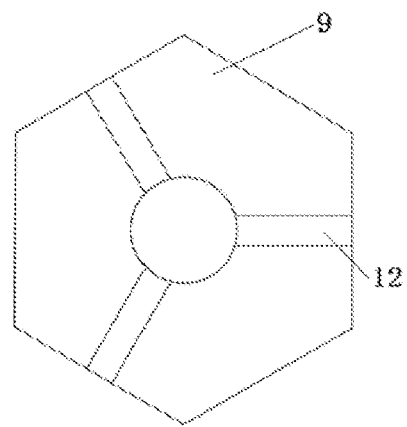
FIG. 3 is a schematic diagram showing an inner structure of an adjusting nut according to the present disclosure.

An embodiment of the present disclosure provides a safety relief valve for a high-pressure hydrogen cylinder. As shown in FIGS. 1 to 3, the safety relief valve includes the valve block 1 and the pressure relief valve 2 fixedly provided on the valve block. The pressure relief valve includes the external flow guide sleeve 3 and an internal valve core structure. A lower end of the flow guide sleeve is fixedly connected to the valve block, and an upper end of the flow guide sleeve is provided with the pressure relief outlet 11 communicating with the inside. The pressure relief outlet is provided with a connection port connected to a hydrogen collection tube. The valve core structure includes the mounting seat 4, the sealing plug 5, the fusible seal 6, the compression spring 8 and the adjusting nut 9. The sealing plug tightly seals a gas outlet of the valve block. The mounting seat is provided outside the sealing plug and fixedly connected to the valve block. The mounting seat is threadedly connected to the adjusting nut that is able to be adjusted up and down through a thread. The mounting seat and the adjusting nut are provided therein with a vent channel communicating with the sealing plug. The exhaust holes 12 communicating with the outside are provided at an inner top of the adjusting nut. The compression spring is fixedly connected between the inner top of the adjusting nut and the sealing plug. The outside of the sealing plug is filled with the fusible seal.

The fusible seal is made of a fusible alloy. The mounting seat is fixedly screwed to the valve block. The lower end of the flow guide sleeve is threadedly connected to the valve block. Three exhaust holes are evenly distributed laterally along a circumference. An internal thread is provided at the connection port. A fastening bayonet is provided at a threaded connection between an outer side of the lower end of the flow guide sleeve and the valve block. The sealing ring 10 is sleeved on the fastening bayonet. A temperature sensor and a pressure sensor are connected to the valve block. A combined valve seat is connected to the valve block. An isolating ring is fixedly connected to the sealing plug, and an outer side of the isolating ring is evenly provided with the vent holes 7 along a circumference to communicate with an inner side of the isolating ring.

When the safety relief valve for a high-pressure hydrogen cylinder is used, the adjusting nut moves up and down to adjust the pressure of the compression spring on the sealing plug, so as to adjust the pressure in the hydrogen cylinder to reach an upper limit of pressure relief, which is convenient. The safety relief valve is provided with the fusible seal. When the temperature is lower than a melting point, the fusible seal solidifies, and the sealing plug keeps the gas outlet sealed to prevent hydrogen leakage. When the temperature is higher than the melting point, the fusible seal melts. When the pressure in the hydrogen cylinder is higher than the set upper limit, the sealing plug is forced to open, such that the hydrogen flows from the exhaust hole to the hydrogen collection tube, thereby relieving the pressure and preventing an explosion.

The above embodiment is merely a preferred solution of the present disclosure, and is not intended to limit the present disclosure in any form. Other variations and modifications may further be made to the above embodiment without departing from the technical solution described in the claims.

What is claimed is:

1. A safety relief valve for a high-pressure hydrogen cylinder, comprising a valve block and a pressure relief valve fixedly provided on the valve block, wherein
    the pressure relief valve comprises an external flow guide sleeve and an internal valve core structure, wherein a lower end of the external flow guide sleeve is fixedly connected to the valve block, and an upper end of the external flow guide sleeve is provided with a pressure relief outlet communicating with an inside of the pressure relief valve; the pressure relief outlet is provided with a connection port connected to a hydrogen collection tube;
    the internal valve core structure comprises a mounting seat, a sealing plug, a fusible seal, a compression spring and an adjusting nut, wherein the sealing plug tightly seals a gas outlet of the valve block; the mounting seat is provided outside the sealing plug and fixedly connected to the valve block; the mounting seat is threadedly connected to the adjusting nut, and the adjusting nut is configured to be adjusted up and down through a thread; the mounting seat and the adjusting nut are provided therein with a vent channel communicating with the sealing plug; exhaust holes communicating with an outside of the pressure relief valve are provided at an inner top of the adjusting nut; the compression spring is fixedly connected between the inner top of the adjusting nut and the sealing plug; an outside of the sealing plug is filled with the fusible seal.

2. The safety relief valve for the high-pressure hydrogen cylinder according to claim 1, wherein the fusible seal is made of a fusible alloy.

3. The safety relief valve for the high-pressure hydrogen cylinder according to claim 1, wherein the mounting seat is fixedly screwed to the valve block.

4. The safety relief valve for the high-pressure hydrogen cylinder according to claim 1, wherein the lower end of the external flow guide sleeve is threadedly connected to the valve block.

5. The safety relief valve for the high-pressure hydrogen cylinder according to claim 1, wherein three exhaust holes are evenly distributed laterally along a circumference.

6. The safety relief valve for the high-pressure hydrogen cylinder according to claim 1, wherein an internal thread is provided at the connection port.

7. The safety relief valve for the high-pressure hydrogen cylinder according to claim 4, wherein a fastening bayonet is provided at a threaded connection between an outer side of the lower end of the external flow guide sleeve and the valve block, and a sealing ring is sleeved on the fastening bayonet.

8. The safety relief valve for the high-pressure hydrogen cylinder according to claim 1, wherein a temperature sensor and a pressure sensor are connected to the valve block.

9. The safety relief valve for the high-pressure hydrogen cylinder according to claim 1, wherein a combined valve seat is connected to the valve block.

10. The safety relief valve for the high-pressure hydrogen cylinder according to claim 1, wherein an isolating ring is fixedly connected to the sealing plug, and an outer side of the isolating ring is evenly provided with vent holes along a circumference to communicate with an inner side of the isolating ring.

\* \* \* \* \*